US00RE34813E

United States Patent [19]

Gardella

[11] E Patent Number: Re. 34,813

[45] Reissued Date of Patent: Dec. 27, 1994

[54] THRUST BEARING ASSEMBLY

[75] Inventor: Cameron Gardella, Woodbury, Conn.

[73] Assignee: The Torrington Company, Torrington, Conn.

[21] Appl. No.: 22,386

[22] Filed: Feb. 24, 1993

Related U.S. Patent Documents

Reissue of:

[64] Patent No.: 4,783,183
Issued: Nov. 8, 1988
Appl. No.: 138,180
Filed: Dec. 28, 1987

U.S. Applications:

[63] Continuation of Ser. No. 524,385, May 17, 1990, abandoned.

[51] Int. Cl.[5] ..... F16C 19/30

[52] U.S. Cl. ..... 384/620; 384/539; 384/622

[58] Field of Search ..... 384/621, 620, 539, 585, 384/622, 617

[56] References Cited

U.S. PATENT DOCUMENTS

| | | | |
|---|---|---|---|
| Re. 28,431 | 5/1975 | Alling et al. | 384/621 |
| 2,891,828 | 6/1959 | Winchell . | |
| 3,972,574 | 8/1976 | Pitner . | |
| 3,999,816 | 12/1976 | Pitner . | |
| 4,042,309 | 8/1977 | Hiraga . | |
| 4,166,662 | 9/1979 | Chiba et al. . | |
| 4,310,205 | 1/1982 | Condon . | |
| 4,364,615 | 12/1982 | Euler | 384/539 |
| 4,725,153 | 2/1988 | Tsuruki | 384/620 |
| 4,733,979 | 3/1988 | Tsuruki | 384/620 |

FOREIGN PATENT DOCUMENTS

| | | | |
|---|---|---|---|
| 2118134 | 9/1977 | Germany | 384/627 |
| 3107086 | 5/1985 | Germany . | |
| 3643584 | 8/1987 | Germany . | |

OTHER PUBLICATIONS

Drawing. FC 66257.2 INA Bearing Co. with invoice C-40-921, Mar. 29, 1985.

*Primary Examiner*—Lenard A. Footland
*Attorney, Agent, or Firm*—Sixbey, Friedman, Leedom & Ferguson

[57] ABSTRACT

The thrust bearing fits on a rotatable shaft having an annular groove or in a rotatable housing with an annular groove. One of the thrust bearing races has an axially extending flange with deflective tabs projecting from the flange. The deflective tabs deflect radially when the race is pushed over the end of the rotatable shaft or into a rotatable housing. The deflected tabs spring back into the annular groove when the thrust bearing is fully seated.

13 Claims, 2 Drawing Sheets

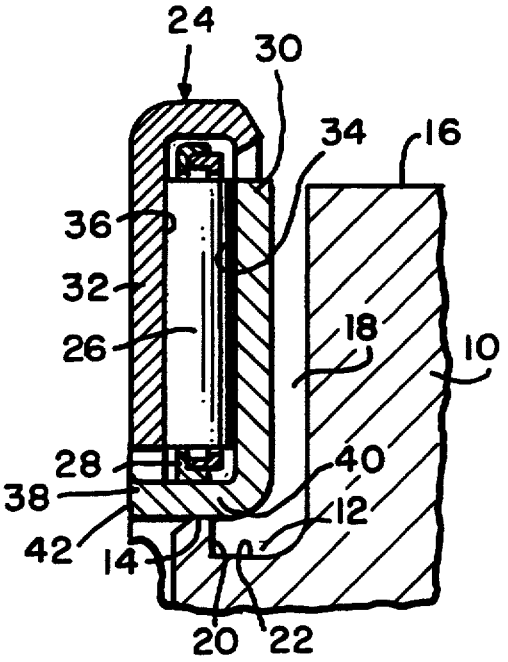
FIG. 1
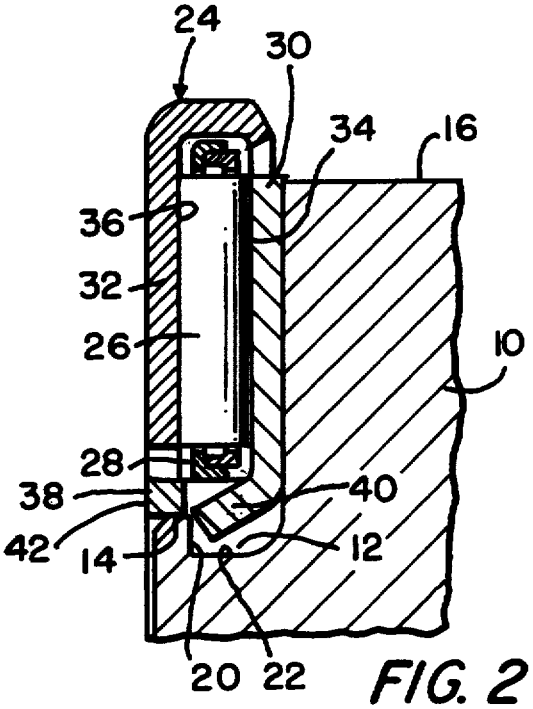
FIG. 2
FIG. 3
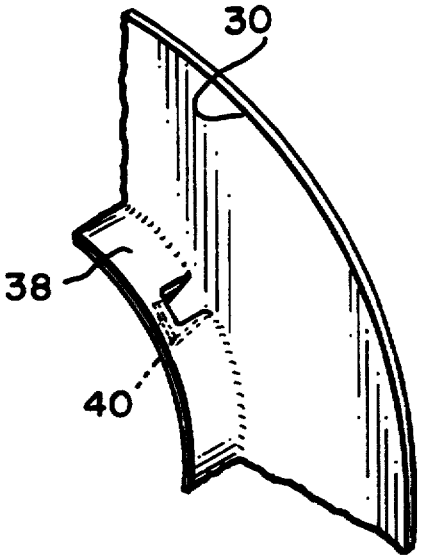
FIG. 4
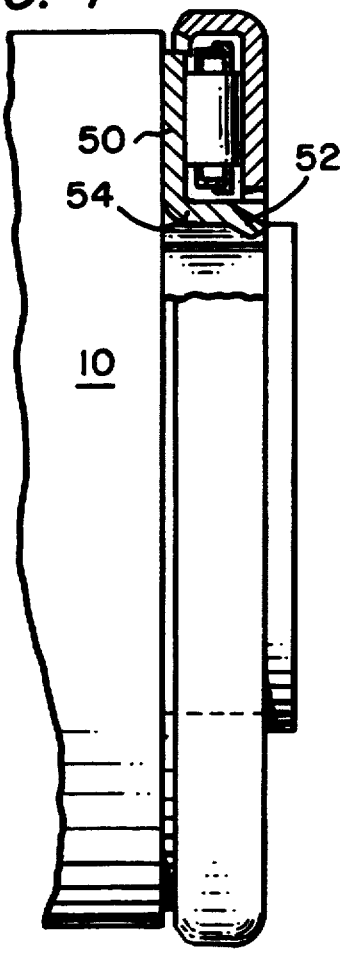

THRUST BEARING ASSEMBLY

Matter enclosed in heavy brackets [ ] appears in the original patent but forms no part of this reissue specification; matter printed in italics indicates the additions made by reissue.

*This application is a continuation of Ser. No. 07/524,385, filed May 17, 1990, now abandoned, and a reissue of 07/138,180, Dec. 28, 1987, now U.S. Pat. No. 4,783,183.*

This invention relates to thrust bearings. More particularly, this invention is a novel thrust bearing which is mounted on a rotatable shaft or rotatable housing.

With some machines or mechanical equipment such as automotive transmissions, the space available in the transmission for required thrust bearings is very limited. Automobile manufacturers are continuously making new transmissions which provide for limited axial space and radial space for thrust bearings which are mounted on a rotatable shaft or housing and there is limited space for the manufacturer of the transmission to provide sufficient piloting surfaces for the bearings. This invention comprises a thrust bearing assembly which requires only a short length of pilot thus saving valuable space in the transmission. It is also important that the transmission assembler not mistakenly assemble the thrust bearing backwards. It is impossible to easily insert the thrust bearing of the present invention backwards. It is also important that once the thrust bearing is assembled the thrust bearing stays in place during operation of the automotive transmission.

There are thrust bearing assemblies currently being manufactured which cannot be assembled backwards and which stay in place during assembly and during operation of the transmission. An example is shown in U.S. Pat. No. 3,972,574 issued Aug. 3, 1976 to Alfred Pitner and entitled "Thrust Rolling Bearing Having Cylindrical Rolling Elements". However, currently manufactured thrust bearing assemblies can fall off their pilots if there should be sufficient clearance between the backup members. This invention prevents the bearing assembly from falling off by using a unique tabbed race configuration that allows the race to snap into a circumferential groove on the pilot.

Briefly described, this invention comprises a thrust bearing used in combination with a rotatable member having an annular groove separating a first axial portion of the rotatable member from a second axial portion of the rotatable member having a greater diameter than the diameter of said first axial portion so that one annular side surface of the groove has a predetermined radial length and the other annular side surface of the groove provides an annular radial surface of greater length. A thrust bearing assembly has rolling elements and a radially extending annular race extending along the annular radial surface of greater diameter. An integral flange extends axially from the race. At least one deflective tab projects from the flange. When assembled on the rotatable member, the deflective tab extends into the rotatable member annular groove preventing the assembly from falling off.

The invention as well as its many advantages may be further understood by reference to the following detailed description and drawings in which:

FIG. 1 is a fragmentary sectional view showing a preferred embodiment of the invention and illustrating how the thrust bearing is assembled on a rotatable shaft;

FIG. 2 is a fragmentary view, partly in section, similar to FIG. 1 and showing the thrust bearing assembled on a rotatable shaft;

FIG. 3 is a perspective view showing a portion of the thrust plate of FIG. 1 and FIG. 2 which has the integral flange with deflective tabs;

FIG. 4 is an elevational view, partly in section, showing a second thrust bearing embodiment assembled on a rotatable shaft;

In the various figures, like parts are referred to by like numbers.

Figure 5:
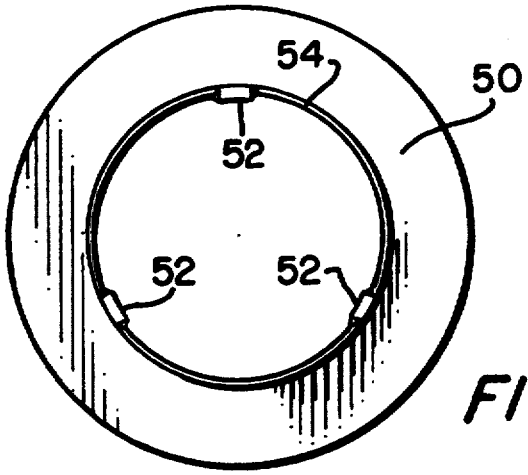
FIG. 5 is a front view of the race of the embodiment of FIG. 4 which has the specially constructed axially extending flange.

Referring to the drawings and more particularly to FIG. 1, a rotatable shaft 10 is provided with an annular groove 12. The annular groove separates the rotatable shaft axial portion 14 having a predetermined outside diameter from the rotatable shaft portion 16 having a greater outside diameter than the outside diameter of portion 14. Thus, the annular radial surface 18 has a greater radial length than the length of the radial annular surface 20. The inside ends of surfaces 18 and 20 are interconnected by the bottom surface 22 of groove 12.

The thrust bearing assembly 24 is provided with rolling elements such as rollers 26. The roller 26 are retained and kept circumferentially separated by a roller cage 28. In the embodiment shown, the thrust bearing assembly also has a pair of axially separated annular thrust races 30 and 32 provided with raceways 34 and 36, respectively.

An integral flange 38 extends axially from the inside diameter of the annular race 30. At least one deflective tab 40 projects from the flange inwardly towards the axis of the rotatable shaft 10 and axially away from the annular race 30. Preferably, there are three circumferentially equally spaced deflective tabs 40. The tabs 40 are cantilevered from the inside diameter of the annular race 30. The inscribed bore diameter measured under the tabs 40 is less than the diameter of the axial portion 14 of rotatable shaft 10. The structure of the deflective tabs is such that the tabs will deflect radially outward when the thrust bearing 24 is pushed over the rotatable shaft portion 14 provided the race 30 is facing the annular surface 18 and not the race 32. Therefore, the assembler cannot assemble the thrust bearing 24 on the rotatable shaft 10 backwards.

FIG. 2 shows the thrust bearing 24 after it has been assembled on the rotatable shaft 10. The deflected tabs 40 spring into the groove 12 when the bearing 24 is fully seated. This relieves any residual stress in the race 30 due to tab deflection during assembly. The dimensions of the flange 38 and tabs 40 are such that axial movement of the thrust bearing assembly along the rotatable shaft is prevented. Further, the race 30 is allowed to pilot on the shaft portion 14 of the assembly.

In the embodiment of FIG. 1, FIG. 2, and FIG. 3, the free ends of the tabs 40 are axially spaced from the free end 42 of the flange 38. In the embodiment of FIG. 4 and FIG. 5, the annular thrust race 50 is provided with at least one and preferably three circumferentially equally spaced deflective tabs 52 (see FIG. 5) with the deflective tabs 52 located at the free end of the annular flange 54. The other elements of the embodiment of FIG. 4 and FIG. 5 are the same as the other elements of FIG. 1, FIG. 2, and FIG. 3.

Figure 6:
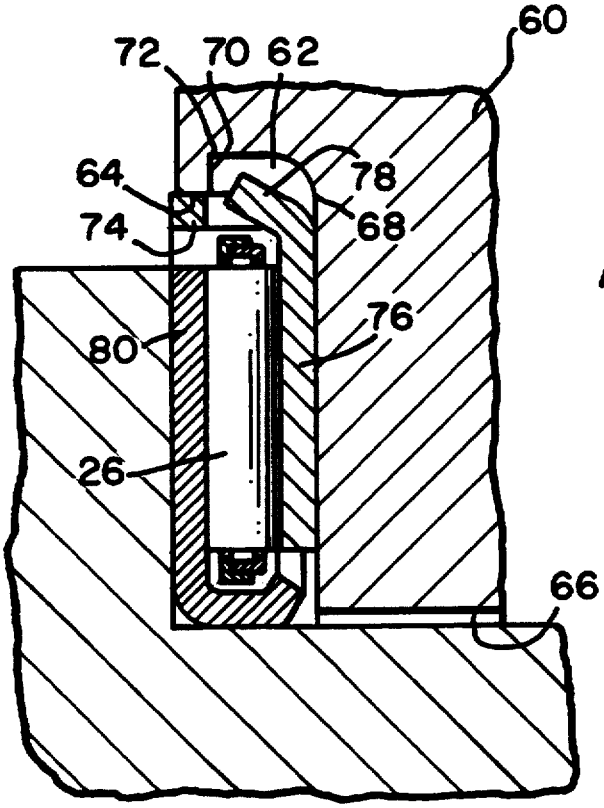
FIG. 6 is a fragmentary view, partly in section, showing a third thrust bearing embodiment assembled on a rotatable housing.

In the embodiment of FIG. 6, a rotatable support 60 is provided with an annular groove 62. The annular groove separates the axial portion 64 having a predetermined inside diameter from the axial portion 66 having a smaller inside diameter than the inside diameter of portion 64. Thus, the annular radial surface 68 has a greater radial length than the length of radial annular surface 70. The outside ends of the surfaces 68 and 70 are interconnected by the bottom surface 72 of groove 62.

An integral flange 74 extends axially from the outside diameter of the annular race 76. At least one deflective tab 78 projects from the flange outwardly from the axis of the rotatable support 60 and axially away from the annular race 76. Preferably, there are three circumferentially equally spaced deflective tabs 78. The tabs 78 are cantilevered from the outside diameter of the annular race 76. The inscribed bore diameter measured over the tabs 78 is more than the inside diameter of the axial portion 64 of rotatable support 60. The structure of the deflective tabs is such that the tabs will deflect radially inward when the thrust bearing is pushed past the rotatable support portion 64 provided the race 76 is facing the annular surface 68 and not the race 80. Therefore, the assembler cannot assemble the thrust being on the rotatable support 60 backwards. Further, the race 76 is allowed to pilot on the support portion 64 after assembly.

I claim:

1. In combination: a rotatable member having an annular groove separating a first axial portion of the rotatable member from a second axial portion of the rotatable member having a greater diameter than the diameter of said first axial portion so that one annular side surface of the groove has a predetermined radial length and the other annular side surface of the groove provides a shaft annular radial surface of greater radial length; a thrust bearing assembly having rolling elements, and a radially extending annular race extending along the shaft annular radial surface of greater length; a flange integral with and extending axially from the race; and at least one deflective tab projecting from the flange, said deflective tab extending into said annular groove.

2. The combination of claim 1 wherein there are three tabs equally spaced.

3. The combination of claim 2 wherein the deflective tabs are located at the free end of the flange.

4. The combination of claim 3 wherein the dimensions of the flange and tabs are such that axial movement of the thrust bearing assembly along the shaft is prevented.

5. The combination of claim 4 wherein the rotatable member is a rotatable shaft, the flange extends axially from the inner diameter of the race, and the deflective tabs project inwardly toward the axis of the rotatable shaft and axially away from the annular race.

6. The combination of claim 2 wherein the free ends of the deflective tabs are axially spaced from the free end of the flange.

7. The combination of claim 4 wherein the rotatable member is a rotatable housing, the flange extends axially from the outer diameter of the race, and the deflective tabs project outwardly from the axis of the rotatable housing and axially away from the annular race.

*8. A structure for fixing a thrust roller bearing interposed between two elements which each have an axis and which are rotatable relative to one another, the structure comprising:*

*an inner race;*

*an outer race;*

*a plurality of rollers disposed between said races and a retainer for said rollers;*

*an inner race cylindrical portion on said inner race which extends axially toward said outer race;*

*an outer race cylindrical portion on said outer race which extends axially toward said inner race;*

*said inner race cylindrical portion and said outer race cylindrical portion holding the retainer therebetween;*

*race rest means provided on one of said two elements for supporting the thrust roller bearing in a generally fixed position relative to the axes of said two elements, said race rest means having a rest face for engaging one of said inner race and said outer race, and said race rest means having a cylindrical face which is generally perpendicular to said rest face;*

*a recess defined in said one of said two elements by said race rest means; and*

*projection means extending from one of the inner race cylindrical portion and outer race cylindrical portion into said recess for engaging the cylindrical face of the race rest means when said two elements attempt to separate to prevent the race having the projection means from coming off.*

*9. The structure as recited in claim 8, wherein the projection means comprises a plurality of projection provided along the circumference of the race.*

*10. The structure as recited in claim 8, wherein said recess is a generally circular groove.*

*11. The structure as recited in claim 8, wherein the projection means comprises at least one projection which is bent with tapering from the edge of the one cylindrical portion.*

*12. The structure as recited in claim 8, wherein the inner race cylindrical portion is the one cylindrical portion having the projection means.*

*13. The structure as recited in claim 8, wherein the outer race cylindrical portion is the one cylindrical portion having the projection means.*

* * * * *